(12) United States Patent
Kang et al.

(10) Patent No.: US 10,668,915 B2
(45) Date of Patent: Jun. 2, 2020

(54) TRANSMISSION FOR ELECTRIC VEHICLE

(71) Applicants: Hyundai Motor Company, Seoul (KR); Kia Motors Corp., Seoul (KR)

(72) Inventors: Ma Ru Kang, Yongin-si (KR); Sun Sung Kwon, Anyang-si (KR); Yong Uk Shin, Suwon-si (KR); Seong Wook Ji, Gunpo-si (KR); Soon Ki Eo, Ansan-si (KR); Chon Ok Kim, Yongin-si (KR); Il Han Yoo, Hwasun-eup (KR); Min Ho Chae, Asan-si (KR); Yong Sug Choi, Hwaseong-si (KR); Ki Tae Kim, Incheon (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 88 days.

(21) Appl. No.: 16/035,999

(22) Filed: Jul. 16, 2018

(65) Prior Publication Data

US 2019/0315332 A1    Oct. 17, 2019

(30) Foreign Application Priority Data

Apr. 11, 2018   (KR) .......................... 10-2018-0042265

(51) Int. Cl.
*B60W 10/08* (2006.01)
*F16D 23/04* (2006.01)
(Continued)

(52) U.S. Cl.
CPC .............. *B60W 10/08* (2013.01); *B60K 6/48* (2013.01); *B60W 20/15* (2016.01); *F16D 23/04* (2013.01);
(Continued)

(58) Field of Classification Search
CPC ........... F16H 37/046; F16H 2061/0422; F16H 3/089; F16D 23/04
(Continued)

(56) References Cited

U.S. PATENT DOCUMENTS

| 7,462,121 B2 * | 12/2008 | Janson | B60K 6/387 475/214 |
| 2017/0241537 A1 * | 8/2017 | Kobayashi | F16H 1/28 |

(Continued)

FOREIGN PATENT DOCUMENTS

| DE | 102007042949 A1 * | 4/2009 | ............... B60K 6/36 |
| KR | 10-2017-0018220 A | 2/2017 | |

OTHER PUBLICATIONS

English translation of DE102007042949A1; http://translationportal.epo.org; Sep. 20, 2019 (Year: 2019).*

*Primary Examiner* — Roger L Pang
(74) *Attorney, Agent, or Firm* — Morgan, Lewis & Bockius LLP

(57) ABSTRACT

A transmission for an electric vehicle, may include a concentric deceleration device for receiving power from a motor shaft and for decelerating; an output shaft disposed in parallel with the input shaft; a hollow shaft rotatably provided on the input shaft; a clutch device provided to switch the transmission state of power from the input shaft to the hollow shaft; a first synchronizer having a hub fixed to the input shaft; a second synchronizer having a hub fixed to the hollow shaft; a plurality of driving gears having different sizes and provided on the input shaft and the hollow shaft to be engaged with at least one of the first synchronizer and the second synchronizer; and a plurality of driven gears provided on the output shaft to be engaged with the plurality of driving gears to form different shift ratios, respectively.

9 Claims, 14 Drawing Sheets

(51) Int. Cl.
  *F16H 61/04*    (2006.01)
  *B60K 6/48*    (2007.10)
  *B60W 20/15*    (2016.01)
  *F16H 3/089*    (2006.01)
  *B60K 6/365*    (2007.10)
  *F16H 37/04*    (2006.01)

(52) U.S. Cl.
  CPC ......... *F16H 3/089* (2013.01); *F16H 61/0403* (2013.01); *B60K 6/365* (2013.01); *B60K 2006/4816* (2013.01); *F16H 37/046* (2013.01); *F16H 2061/0422* (2013.01); *F16H 2200/0021* (2013.01); *F16H 2200/0039* (2013.01)

(58) Field of Classification Search
  USPC ............................... 475/207, 5; 74/329, 330
  See application file for complete search history.

(56) References Cited

U.S. PATENT DOCUMENTS

| | | | |
|---|---|---|---|
| 2018/0319267 A1* | 11/2018 | Kaltenbach | ............ B60K 6/365 |
| 2018/0354520 A1* | 12/2018 | Kaltenbach | ............ B60K 6/365 |
| 2019/0135261 A1* | 5/2019 | Gersten | .................. B60K 6/365 |

* cited by examiner

# TRANSMISSION FOR ELECTRIC VEHICLE

CROSS REFERENCE TO RELATED APPLICATION

The present application claims priority to Korean Patent Application No. 10-2018-0042265, filed Apr. 11, 2018, the entire contents of which is incorporated herein for all purposes by this reference.

BACKGROUND OF THE INVENTION

Field of the Invention

The present invention relates to a transmission for an electric vehicle and, more particularly, to a configuration of a power train that can ensure sufficient driving performance of a vehicle while using a driving motor having as small a capacity as possible.

Description of Related Art

An electric vehicle provides a driving force required for driving a vehicle by a driving motor, instead of an engine, and the driving motor substantially becomes more expensive in proportion to the capacity or size thereof. As the size of the driving motor increases, the driving motor provides a broader range of driving force, but the weight of the vehicle increases, thereby degrading gas mileage.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a transmission for an electric vehicle, which can secure sufficient driving performance, such as the maximum speed, acceleration performance, and climbing performance of a vehicle, while using a driving motor with as small a capacity as possible to provide necessary driving performance of a vehicle while reducing the cost required for manufacturing the vehicle, thereby ultimately maximizing the commerciality of the vehicle.

In accordance with an aspect of the present invention, a transmission for an electric vehicle according to an exemplary embodiment of the present invention may include: a concentric deceleration device configured for receiving power from a motor shaft and for decelerating and outputting the same to an input shaft concentric with the driving motor shaft; an output shaft disposed in parallel with the input shaft; a hollow shaft rotatably provided on the input shaft; a clutch device provided to switch the transmission state of power from the input shaft to the hollow shaft; a first synchronizer having a hub fixed to the input shaft; a second synchronizer having a hub fixed to the hollow shaft; a plurality of driving gears having different sizes and provided on the input shaft and the hollow shaft to be engaged with at least one of the first synchronizer and the second synchronizer; and a plurality of driven gears provided on the output shaft to be engaged with the plurality of driving gears to form different shift ratios, respectively.

The concentric deceleration device may be configured as a single pinion planetary gear having a ring gear R which is fixed.

The plurality of driving gears may include: a first-stage driving gear provided to be engaged with the first synchronizer; a second-stage driving gear provided to be engaged with the first synchronizer and the second synchronizer, respectively; and a third-stage driving gear provided to be engaged with the second synchronizer.

A first clutch gear to be engaged with a sleeve of the first synchronizer may be integrally provided on one side of the second-stage driving gear, and a second clutch gear to be engaged with a sleeve of the second synchronizer may be integrally provided on the opposite side of the second-stage driving gear.

The clutch device may include: a frictional clutch configured to receive linear displacement along the axial direction of the input shaft from the outside and configured to allow a frictional force generated in a clutch disk provided on the hollow shaft to vary in proportion to the linear displacement; and an actuator configured to provide, to the frictional clutch, linear displacement along the axial direction of the input shaft.

The actuator may be configured to include: a housing; a ball screw device provided in the housing to provide linear displacement to the frictional clutch by a ball nut moving linearly along the direction of the input shaft; a control motor provided in the housing to drive a screw of the ball screw device; and a self-locking mechanism provided in the housing to support the ball nut, which is in the advanced state toward the frictional clutch by interlocking with rotation of the screw, to prevent reverse movement of the ball nut.

The self-locking mechanism may be configured to include: a wedge piston provided in the housing to linearly move in a direction perpendicular to the input shaft while being in contact with a rear end portion of the ball nut by inclined surfaces therebetween; and an interlocking device provided to move the wedge piston linearly by receiving a rotational force of the screw.

The interlocking device may be configured to include: a rack gear formed on the wedge piston; a pinion engaged with the rack gear; and an interlocking gear provided on the rotation axis of the pinion along with the pinion to be engaged with the screw at an external circumferential surface thereof.

According to an exemplary embodiment of the present invention, it is possible to secure sufficient driving performance, such as the maximum speed, acceleration performance, and climbing performance of a vehicle, while using a driving motor with as small a capacity as possible, so that necessary driving performance of a vehicle can be obtained while reducing the cost required for manufacturing the vehicle, thereby ultimately maximizing commerciality of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
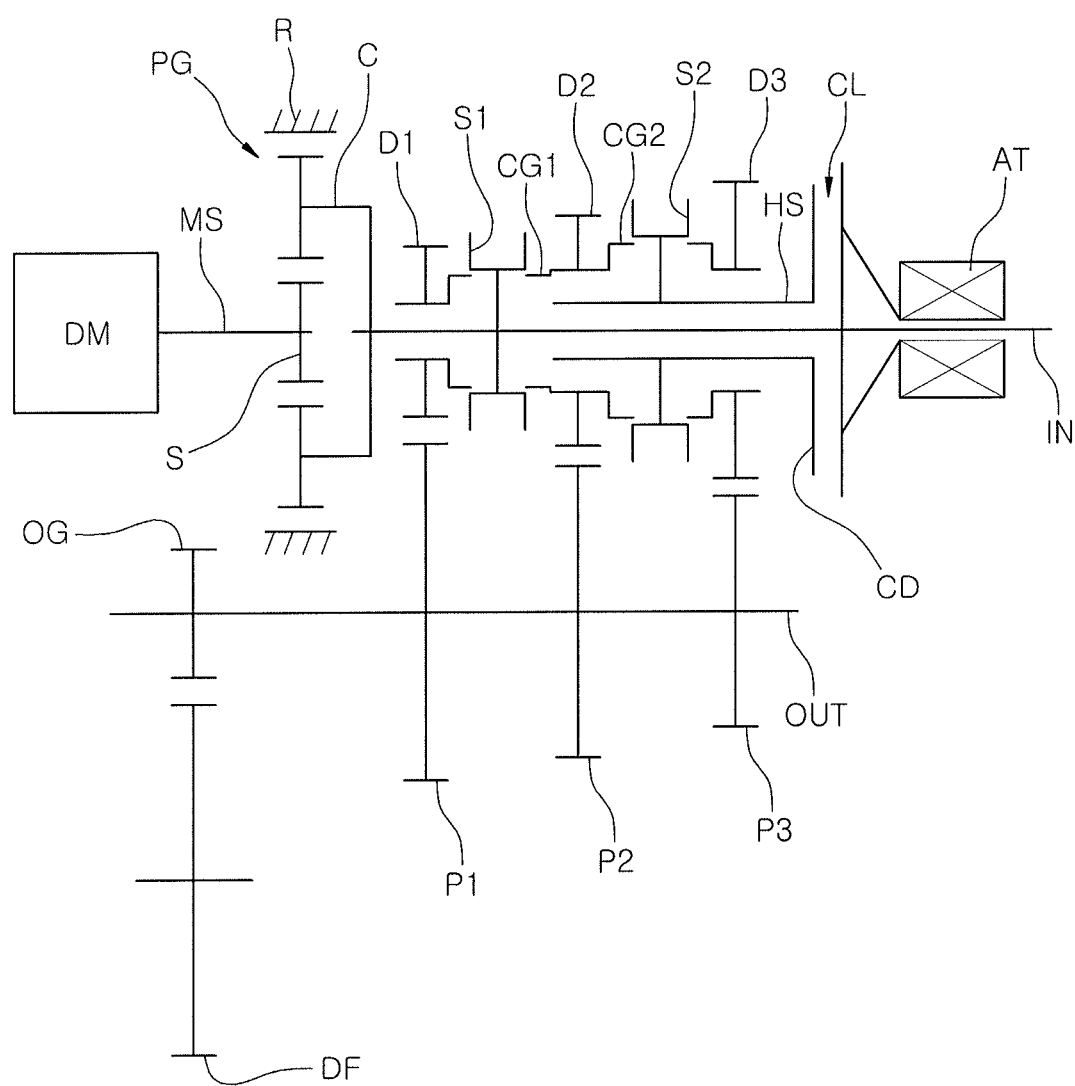
FIG. 1 is a diagram showing a structure of a transmission for an electric vehicle according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 13, the exemplary embodiment of the present invention is configured to include: a concentric deceleration device configured for receiving power from a motor shaft (MS) and for decelerating and outputting the same to an input shaft (IN) concentric with the motor shaft (MS); an output shaft (OUT) disposed in parallel with the input shaft (IN); a hollow shaft (HS) rotatably provided on the input shaft (IN); a clutch device provided to switch the transmission state of power from the input shaft (IN) to the hollow shaft (HS); a first synchronizer (S1) having a hub fixed to the input shaft (IN); a second synchronizer (S2) having a hub fixed to the hollow shaft (HS); a plurality of driving gears having different sizes and provided on the input shaft (IN) and the hollow shaft (HS) to be engaged with at least one of the first synchronizer (S1) and the second synchronizer (S2); and a plurality of driven gears provided on the output shaft (OUT) to be engaged with the plurality of driving gears to form different shift ratios.

The output shaft (OUT) is integrally provided with an output gear (OG) coupled to a differential (DF) so that the power transmitted from the input shaft (IN) is distributed to driving wheels on both sides via the differential (DF).

In the present embodiment, the concentric deceleration device is configured as a single pinion planetary gear (PG) having a ring gear R.

In an exemplary embodiment of the present invention, the ring gear R is fixed to a housing of the single pinion planetary gear (PG).

In this configuration, the power of the driving motor is input to the motor shaft (MS) coupled to a sun gear S of the planetary gear (PG) and is decelerated and output to the input shaft (IN) coupled to a carrier C thereof.

It is possible to realize a configuration in which the power of the driving motor is decelerated and output through the input shaft (IN) coupled to the carrier C by adopting a configuration in which the sun gear S of the planetary gear (PG) is fixed and the motor shaft (MS) is coupled to the ring gear R.

In the present embodiment, the plurality of driving gears are configured to include a first-stage driving gear (D1) provided to be engaged with the first synchronizer (S1); a second-stage driving gear (D2) provided to be engaged with the first synchronizer (S1) and the second synchronizer (S2), respectively; and a third-stage driving gear (D3) provided to be engaged with the second synchronizer (S2).

That is, a first clutch gear (CG1) to be engaged with a sleeve of the first synchronizer (S1) is integrally provided on one side of the second-stage driving gear (D2), and a second clutch gear (CG2) to be engaged with a sleeve of the second synchronizer (S2) is integrally provided on the opposite side of the second-stage driving gear (D2) so that the second-stage driving gear (D2) may be engaged with the first synchronizer (S1) or the second synchronizer (S2).

In the present embodiment, a plurality of driven gears of the output shaft (OUT) includes a first-stage driven gear (P1) engaged with the first-stage driving gear (D1) to form a first-stage shift ratio, which is the maximum, a second-stage driven gear (P2) engaged with the second-stage driving gear (D2) to form a second-stage shift ratio, and a third-stage driven gear (P3) engaged with the third-stage driving gear (D3) to form a third-stage shift ratio, which is the minimum.

In the present embodiment, the clutch device includes: a frictional clutch (CL) configured to receive linear displacement along the axial direction of the input shaft (IN) from the outside and configured to allow a frictional force generated in a clutch disk provided on the hollow shaft (HS) to vary in proportion to the linear displacement; and an actuator (AT) configured to provide the frictional clutch (CL) with linear displacement along the axial direction of the input shaft (IN).

The actuator (AT) is configured to include: a housing 1; a ball screw device 5 provided in the housing 1 to provide linear displacement to the frictional clutch (CL) by a ball nut 3 moving linearly along the direction of the input shaft (IN); a control motor 9 provided in the housing 1 to drive a screw 7 of the ball screw device 5; and a self-locking mechanism provided in the housing 1 to support the ball nut 3, which is in the advanced state toward the frictional clutch (CL) by interlocking with rotation of the screw 7, to prevent reverse movement of the ball nut 3.

The self-locking mechanism is configured to include: a wedge piston 11 provided in the housing 1 to linearly move in a direction perpendicular to the input shaft (IN) while being in contact with a rear end portion of the ball nut 3 by inclined surfaces therebetween; and an interlocking device provided to move the wedge piston 11 linearly by receiving a rotational force of the screw 7.

The interlocking device is configured to include: a rack gear 13 formed on the wedge piston 11; a pinion 15 engaged with the rack gear 13; and an interlocking gear 17 provided on the rotation axis of the pinion 15 along with the pinion 15 to be engaged with the screw 7 at an external circumferential surface thereof.

Furthermore, the interlocking device may be implemented using a power transmission device such as a belt, a chain, or the like.

Figure 12:
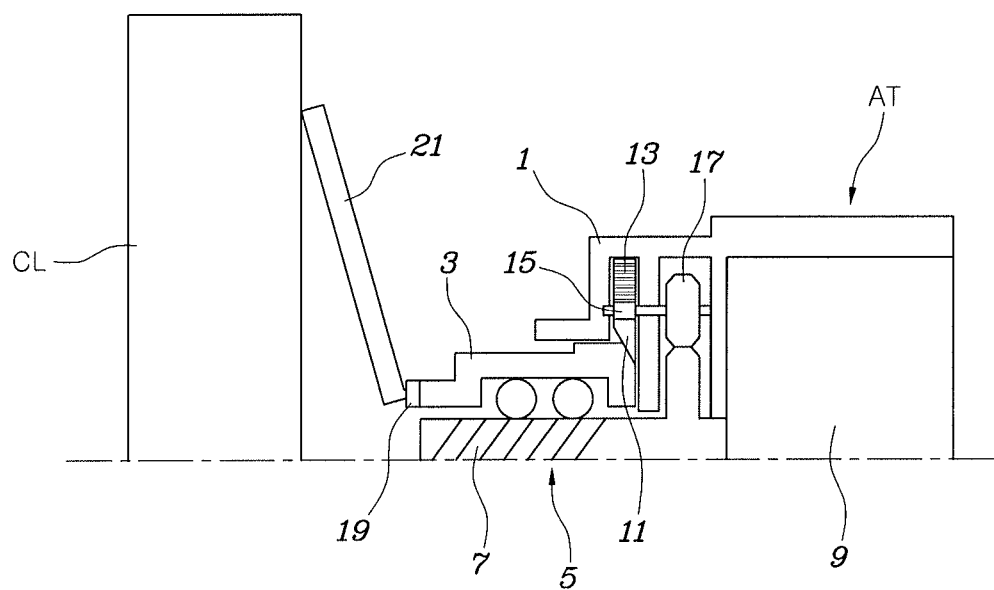
FIG. 12 is a detailed configurational diagram of an actuator in FIG. 1.
Figure 13:
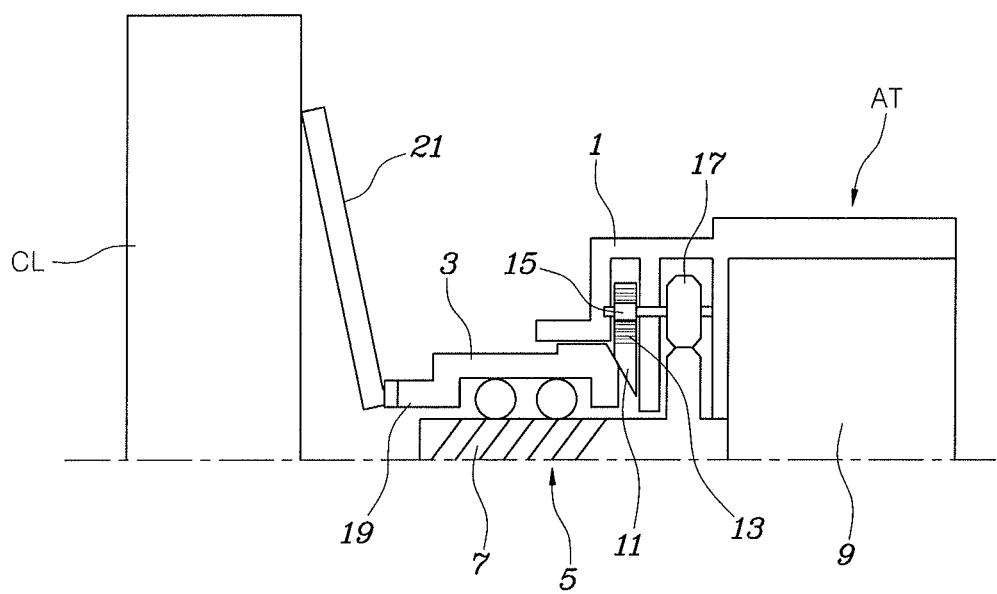
FIG. 13 is a diagram for explaining the operation of an actuator as compared with the structure shown in FIG. 12.

FIG. 12, and FIG. 13 are diagrams for explaining the structure and operation of the actuator (AT) through comparison. Comparing FIG. 12 with FIG. 13, it can be seen that the ball nut 3 moves to the left on the drawing from the state of FIG. 12 to the state of FIG. 13, thereby providing linear displacement to the frictional clutch (CL).

FIG. 12 shows a state before a frictional force is generated in the frictional clutch (CL), and FIG. 13 shows a state in which a frictional force is generated in the frictional clutch (CL) by linear displacement provided by the ball nut 3.

Furthermore, in FIG. 12, and FIG. 13, the direction in which the ball nut 3 moves toward the frictional clutch (CL) will be referred to as a "forward direction", and the opposite direction will be referred to as a "backward direction".

Furthermore, the leaf spring 21 is configured on the front of the ball nut 3 to elastically transmit linear displacement to the frictional clutch (CL) through a bearing 19. The frictional clutch (CL) is configured such that the pressure applied to the clutch disc increases depending on the linear displacement provided by the ball nut 3.

Furthermore, the configuration in which linear displacement is received from the actuator (AT) and is converted to a frictional force of the clutch disc (CD) in the frictional clutch (CL), as described above, may be realized by related arts.

When the control motor 9 is driven by a controller in the state of FIG. 12, the screw 7 rotates so that the ball nut 3 moves toward the frictional clutch (CL) to push the leaf spring 21 through the bearing 19, thereby increasing a frictional force of the frictional clutch (CL).

At the present time, when the interlocking gear 17 is rotated by the rotation of the screw 7, the pinion integrally coupled thereto rotates. Then, the wedge piston 11 formed with the rack gear 13 moves vertically toward the input shaft (IN) as shown in FIG. 13, thereby realizing a self-locking function in which the inclined surface formed on the rear end portion of the ball nut 3 is supported by the inclined surface of the wedge piston 11 so that the ball nut 3 is prevented from being moved backwards even when electric power is not supplied to the control motor 9.

Since the self-locking function described above does not require separate electric power for continuously operating the frictional clutch (CL) while the power is constantly transmitted through the frictional clutch (CL), it is possible to ultimately improve the fuel efficiency and mileage of the electric vehicle.

The operation of the transmission configured as described above will be described with reference to FIG. 2, FIG. 3, FIG. 4, FIG. 5, FIG. 6, FIG. 7, FIG. 8, FIG. 9, FIG. 10, and FIG. 11.

Figure 2:
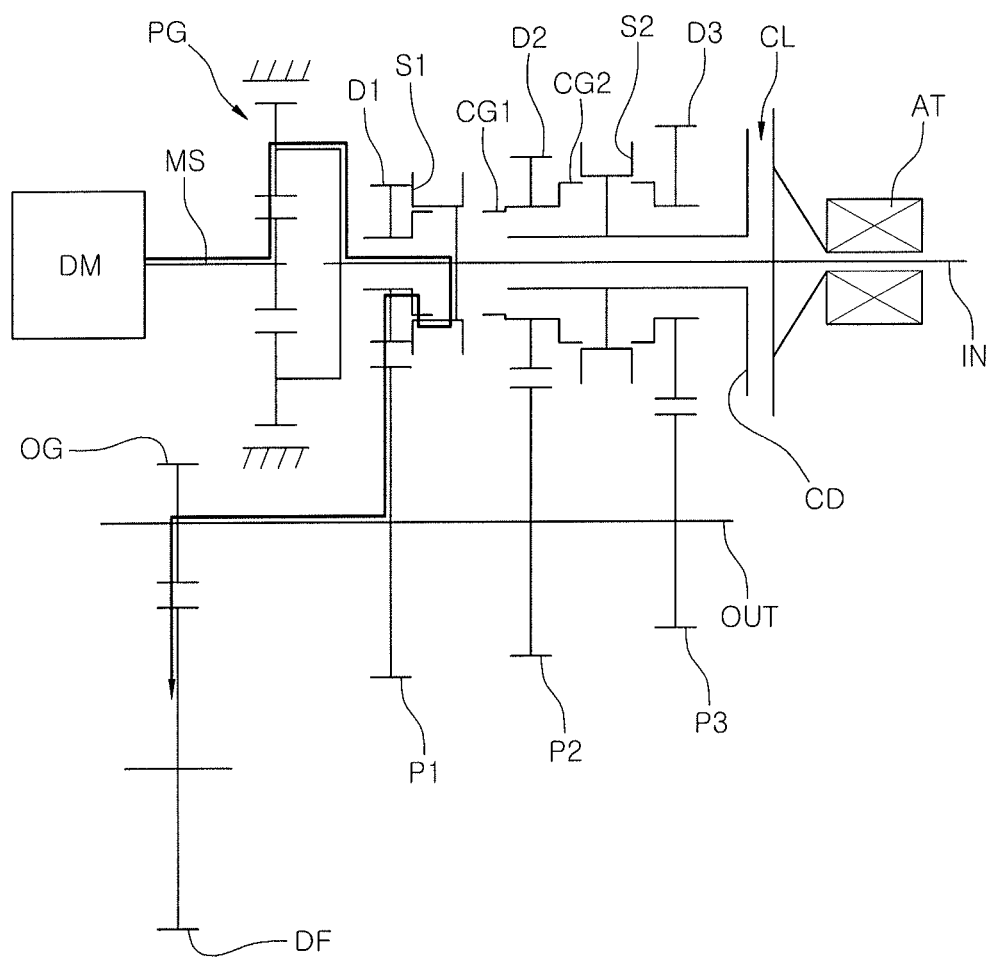
FIG. 2, FIG. 3, FIG. 4, FIG. 5, FIG. 6, FIG. 7, FIG. 8, FIG. 9, FIG. 10, and FIG. 11 are diagrams for explaining the operation of the transmission shown in FIG. 1.

FIG. 2 shows a state in which the first-stage driving is performed by driving the driving motor (DM) while the first synchronizer (S1) is engaged with the first-stage driving gear (D1) in the state shown in FIG. 1. In the instant case, the power of the driving motor (DM) is decelerated by the planetary gear (PG) and is decelerated again by the first-stage driving gear (D1) and the first-stage driven gear (P1) to then be output to the driving wheels via the output shaft (OUT) and the differential (DF).

As described above, in an exemplary embodiment of the present invention, the first-stage shift ratio is implemented by a product of a deceleration ratio provided by the planetary gear (PG) and a gear ratio provided by the first-stage driving gear (D1) and the first-stage driven gear (P1). Thus, compared to the case where the first-stage shift ratio is obtained only by the gear ratio of the first-stage driving gear (D1) to the first-stage driven gear (P1) without the deceleration ratio of the planetary gear (PG), the size of the first-stage driven gear (P1) can be relatively reduced and a sufficient first-stage shift ratio can be formed. Furthermore, the inter-axis distance between the input shaft (IN) and the output shaft (OUT) can be shortened, thereby reducing the overall weight of the transmission. Furthermore, since a relatively high shift ratio can be realized, it is possible to secure sufficient climbing performance of a vehicle even if a relatively small capacity driving motor (DM) is used.

Figure 3:
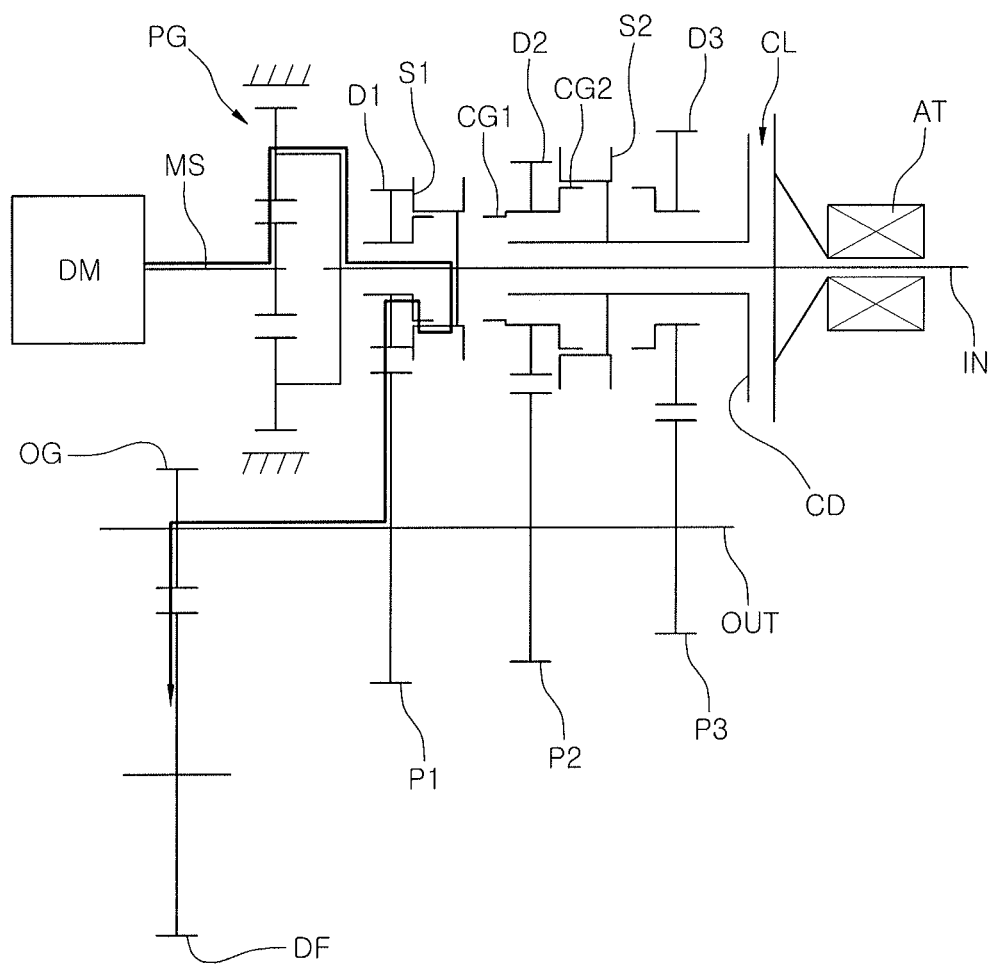

FIG. 3 shows a state in which the second synchronizer (S2) is engaged with the second-stage driving gear (D2) for shifting from the first-stage driving state shown in FIG. 2 to the second stage, but since the frictional clutch (CL) is released, the first-stage driving state still remains.

Figure 4:
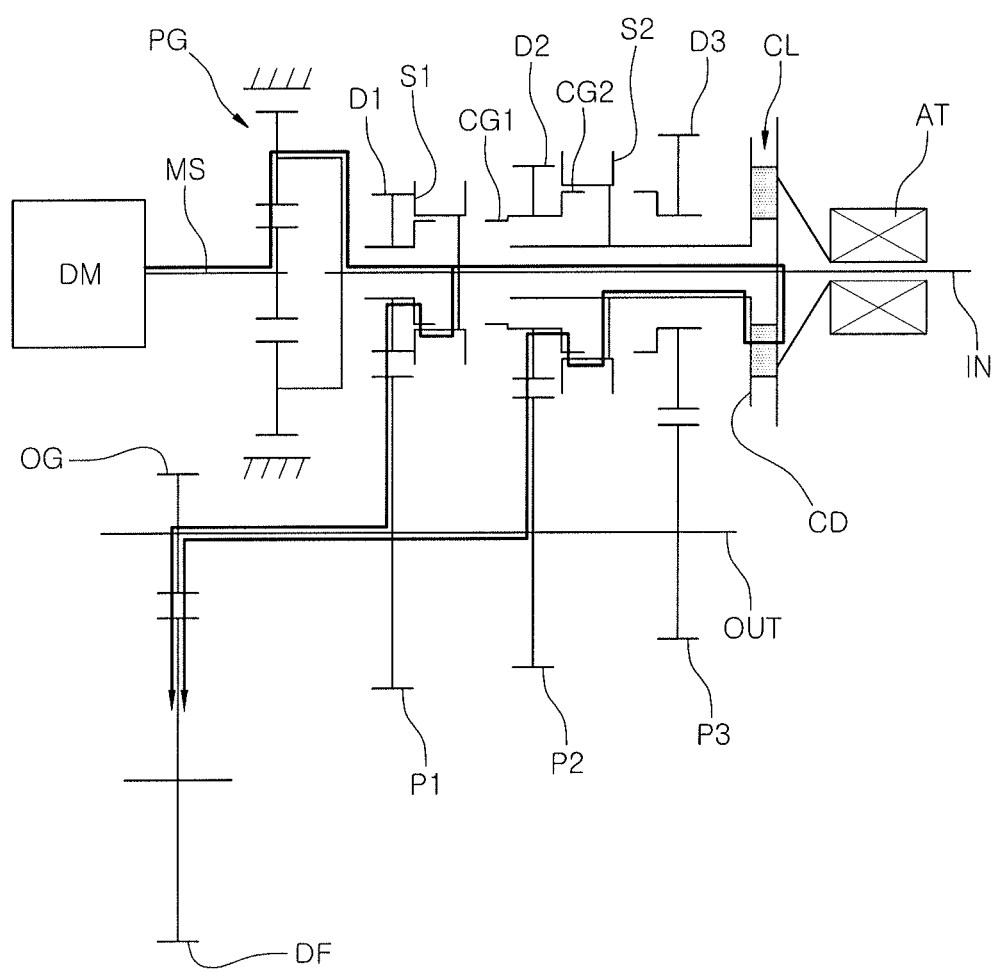

FIG. 4 shows a state in which shifting from the state of FIG. 3 to the second stage is performed by controlling the slip of the frictional clutch (CL). In the instant state, if the first synchronizer (S1) is released to the neutral state, and if the frictional clutch (CL) is fully engaged, as shown in FIG. 5, the shifting to the second stage is completed.

In the case of shifting from the first stage to the second stage as described above, the power is continuously transmitted from the input shaft (IN) to the output shaft (OUT) by controlling the slip of the frictional clutch (CL). Thus, since a torque interruption phenomenon, which is inevitably generated during shifting in the transmission that implements the shifting by a conventional synchronizing mechanism, does not occur, the vehicle disposed with the transmission of the present invention can provide a smooth and soft shifting feeling.

Figure 5:
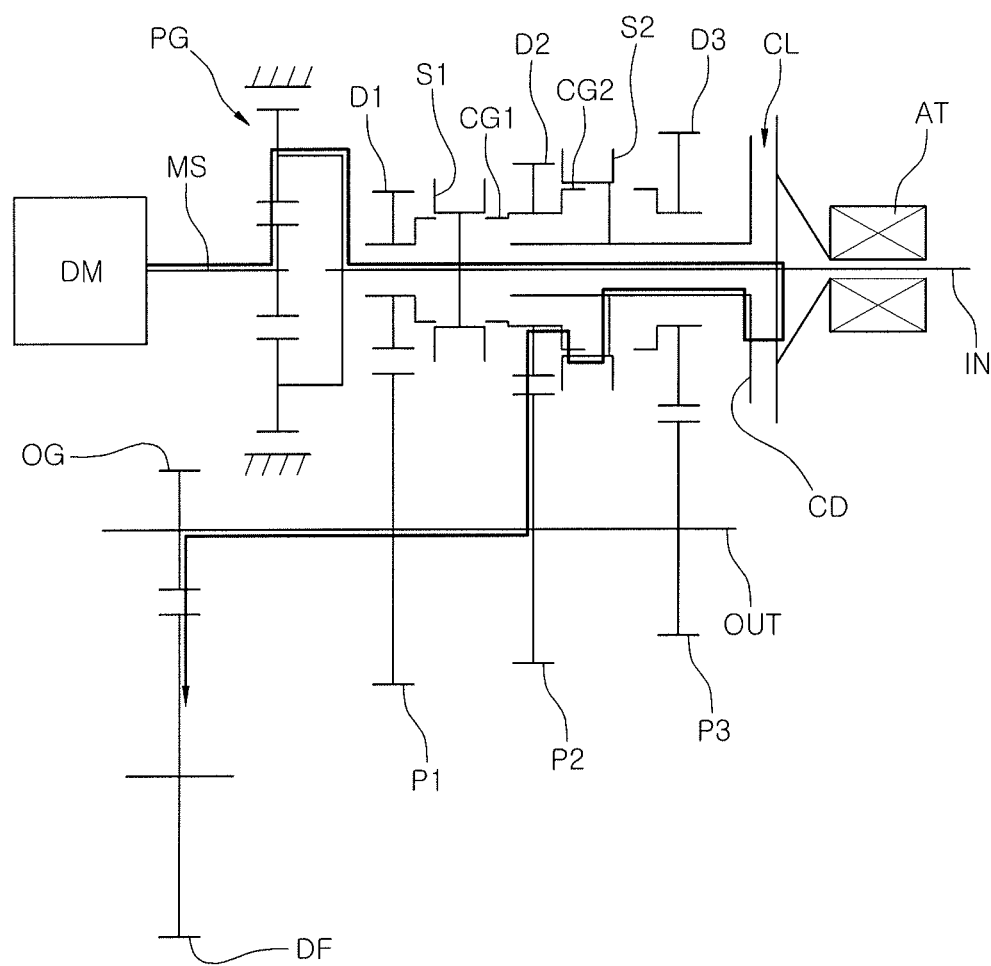
Figure 6:
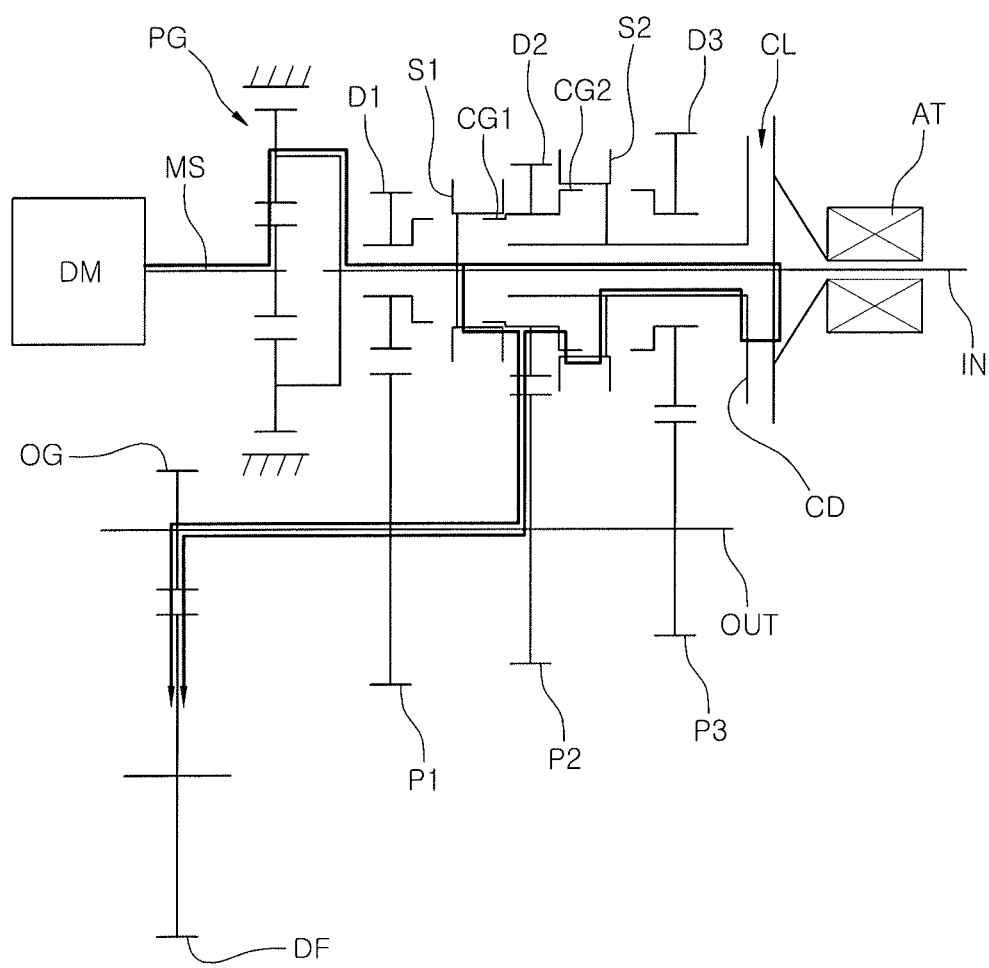

FIG. 6 shows a state in which the first synchronizer (S1) is engaged with the second-stage driving gear (D2) for shifting from the second-stage driving state of FIG. 5 to the third stage. At the present time, since the input shaft (IN) and the hollow shaft (HS) have the same speed by the frictional clutch (CL), the first synchronizer (S1) can be easily engaged with the second-stage driving gear (D2).

Figure 7:
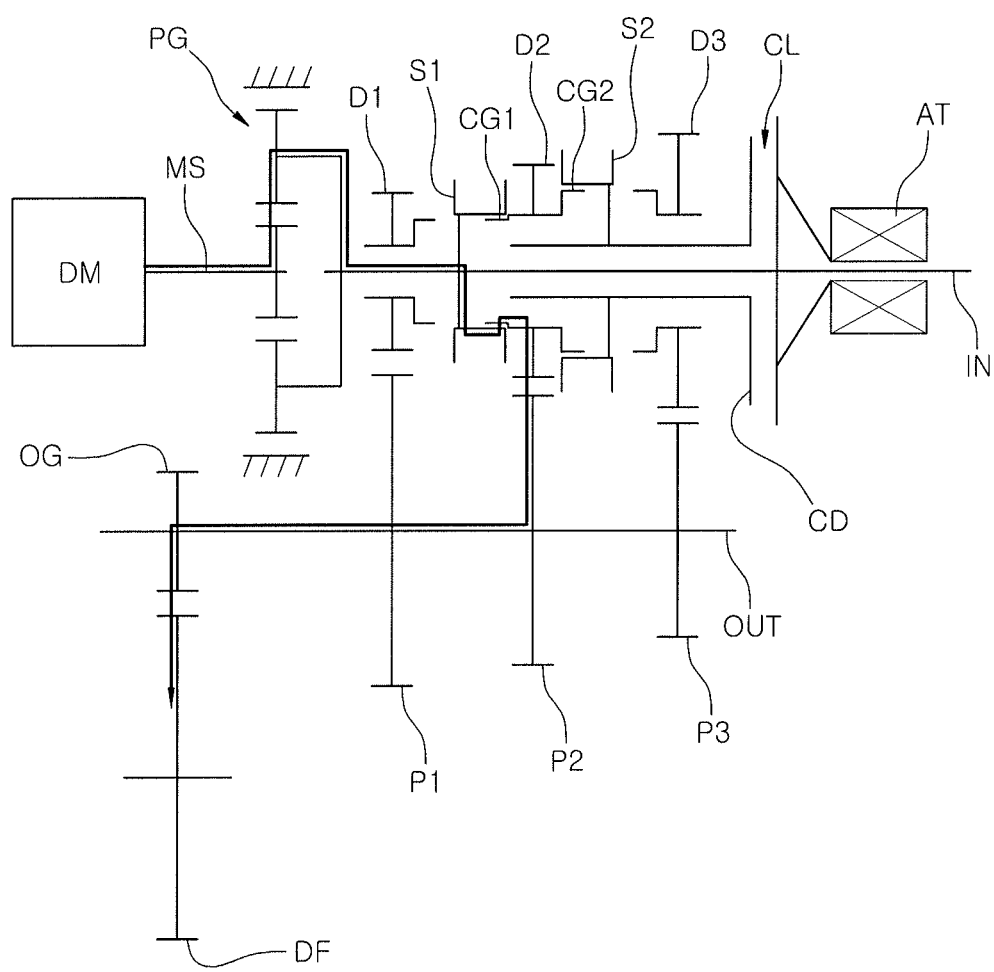

FIG. 7 shows a state in which the frictional clutch (CL) is released in the state shown in FIG. 6, wherein the vehicle remains in the second-stage driving state by the engagement of the first synchronizer (S1) and the second-stage driving gear (D2) even if the frictional clutch (CL) is released.

Figure 8:
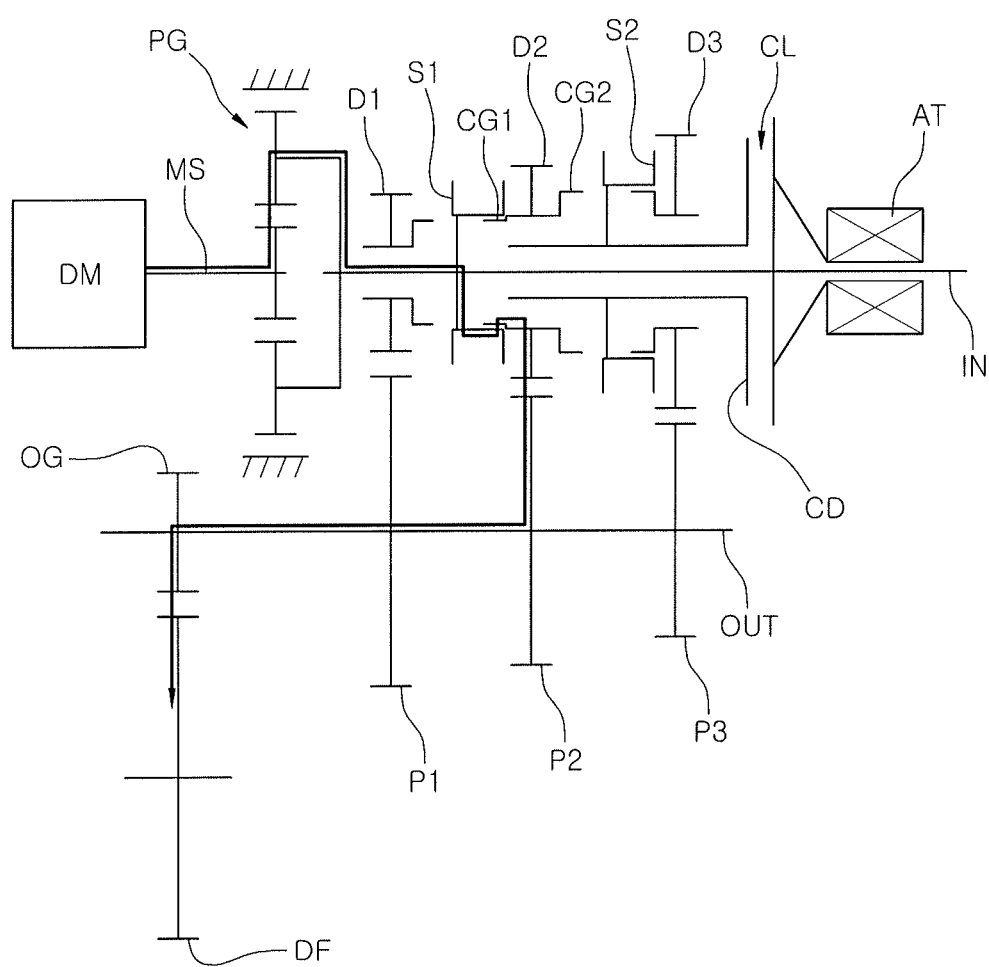
Figure 9:
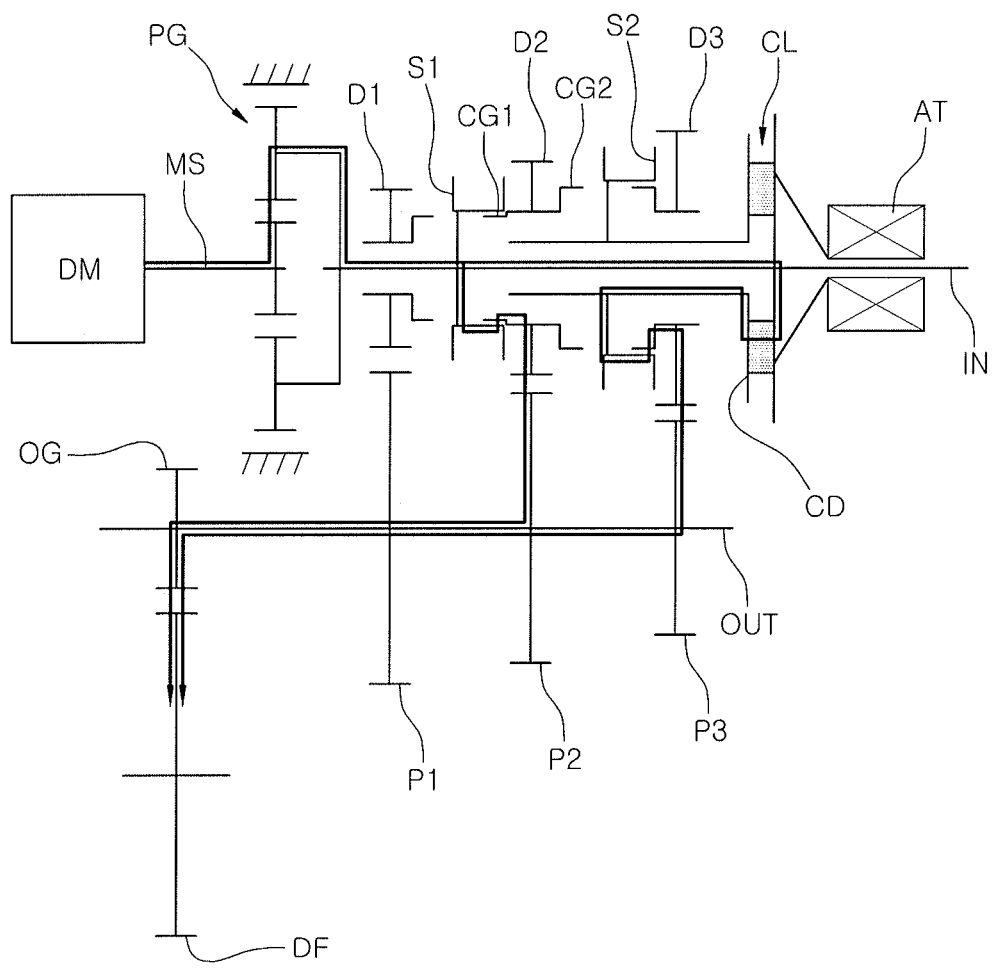
Figure 10:
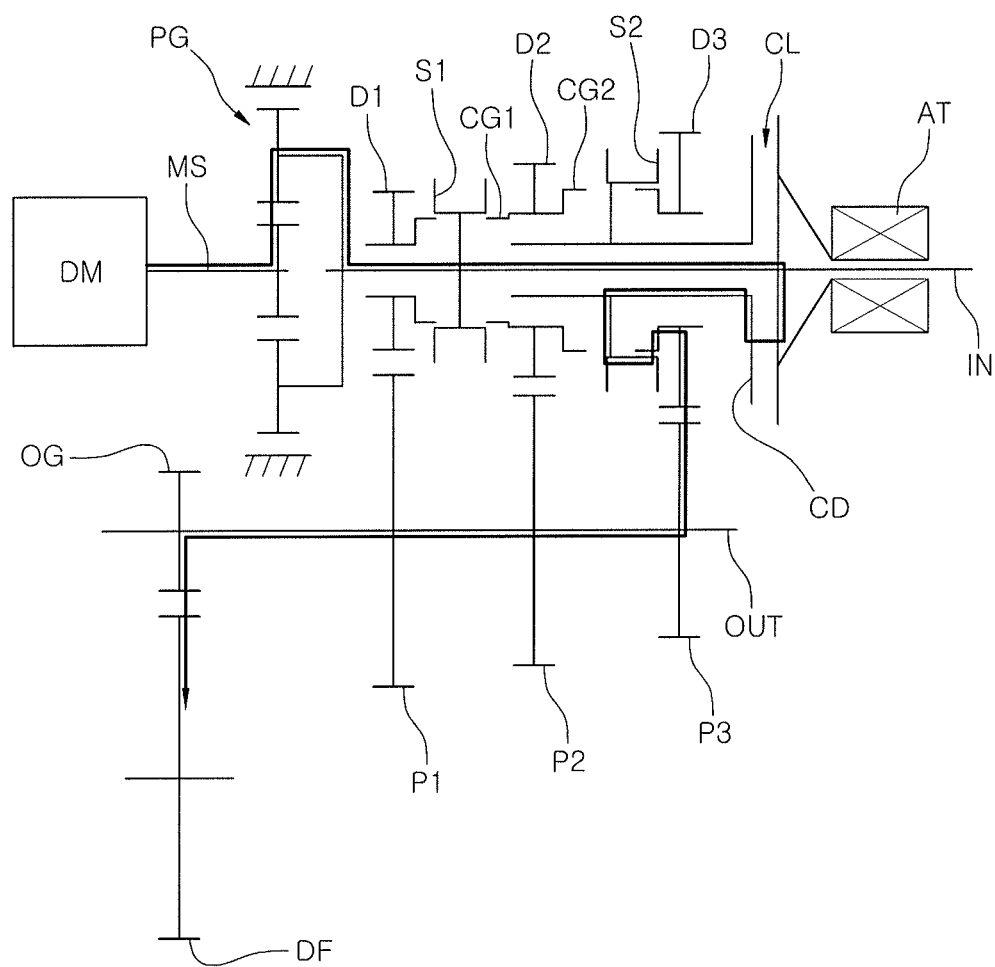

FIG. 8 shows a state in which the second synchronizer (S2) is engaged with the third-stage driving gear for shifting from the state shown in FIG. 7 to the third stage. In the instant state, if the first synchronizer (S1) is released to the neutral state as shown in FIG. 10 while controlling the slip of the frictional clutch (CL) as shown in FIG. 9, and then if the frictional clutch (CL) is fully engaged, the shifting to the third stage is completed.

The torque interruption is also prevented in the shifting process described above, thereby providing a smooth shifting feeling.

Figure 11:
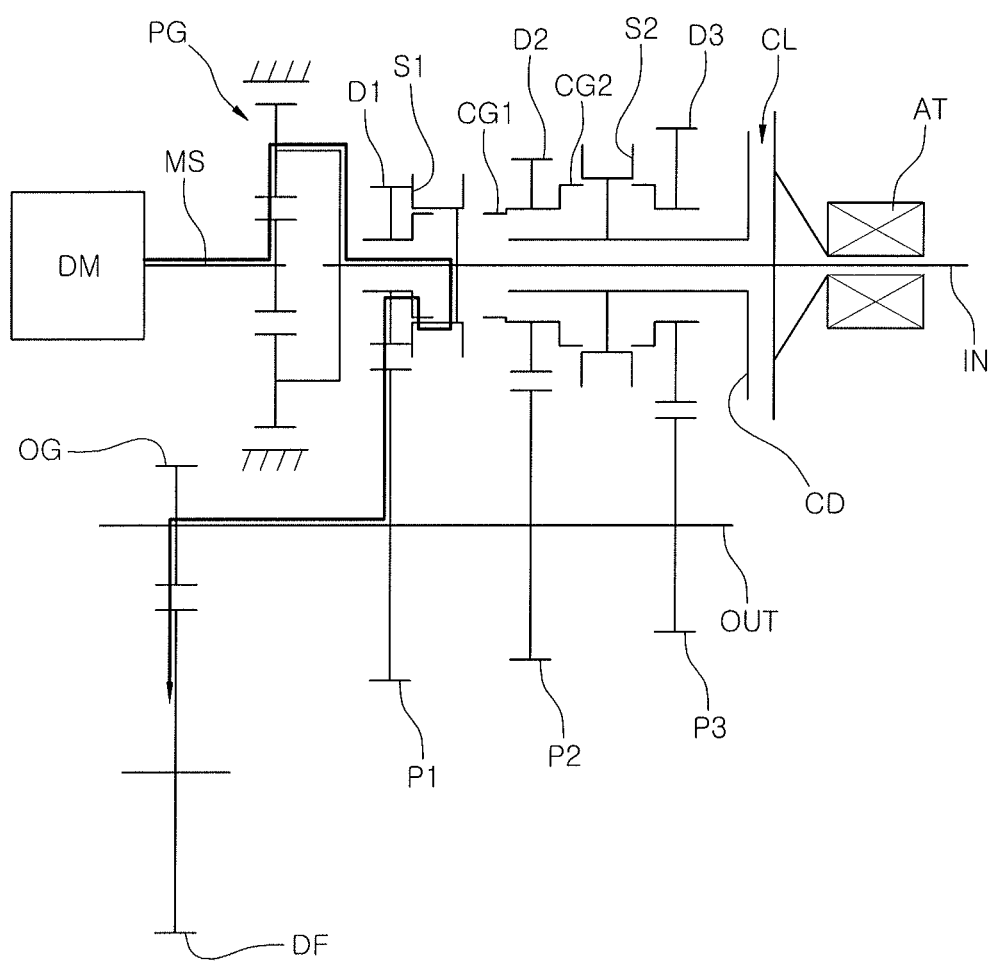

FIG. 11 shows a state in which the reverse shift stage is realized, which is structurally the same as FIG. 3 implementing the first-stage state, but shows a state in which the reverse shift stage is realized by reversing the driving motor (DM).

As described above, in the transmission for an electric vehicle according to an exemplary embodiment of the present invention, since the first-stage shift ratio is formed by the concentric deceleration device, the first-stage driving gear (D1), and the first-stage driven gear (P1), the volume and weight of the transmission can be reduced. Furthermore, since a relatively large shift ratio is obtained, it is possible to secure sufficient climbing performance of a vehicle even with a relatively small capacity driving motor (DM). Furthermore, it is possible to provide relatively more shift stages for the electric vehicle having three forward stages, thereby securing sufficient acceleration performance and maximum speed of the vehicle.

Figure 14:
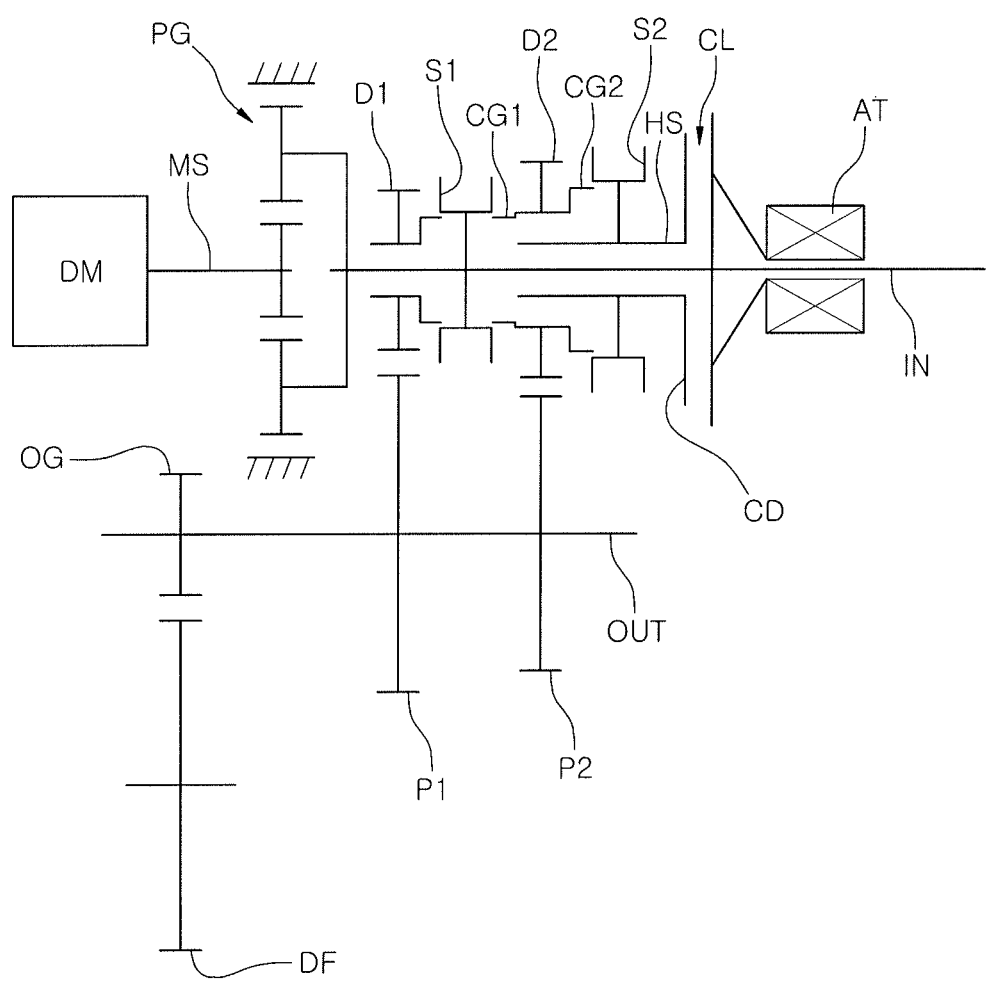
FIG. 14 is a view showing another exemplary embodiment of the present invention.

Meanwhile, FIG. 14 illustrates another exemplary embodiment of the present invention, which shows an example in which the third-stage driving gear (D3) and the third-stage driven gear (P3) are removed from the configuration of FIG. 1 to realize a two-stage transmission for implementing two forward shift stages, and the operation thereof is almost the same as that of the above-described embodiment.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission apparatus for a vehicle the transmission apparatus including:
   a deceleration device coupled to a motor shaft and an input shaft and receiving power from the motor shaft and decelerating a rotation speed of the motor shaft and outputting the power to the input shaft, wherein the motor shaft is continuously engaged to the input shaft;
   an output shaft disposed in parallel with the input shaft;
   a hollow shaft provided on the input shaft and rotatable with respect to the input shaft;
   a clutch device provided to selectively switch a transmission state of the power from the input shaft to the hollow shaft;
   a first synchronizer fixed to the input shaft;
   a second synchronizer fixed to the hollow shaft;
   a plurality of driving gears having different sizes and rotatably provided on the input shaft and the hollow shaft to be engaged with at least one of the first synchronizer and the second synchronizer; and
   a plurality of driven gears fixedly provided on the output shaft to be engaged with the plurality of driving gears to form different shift ratios, respectively.

2. The transmission apparatus for the vehicle according to claim 1, wherein the deceleration device includes a single pinion planetary gear set having a ring gear which is stationary.

3. The transmission apparatus for the vehicle according to claim 1, wherein the plurality of driving gears includes:
   a first-stage driving gear rotatably provided on the input shaft to be selectively engaged with the first synchronizer;
   a second-stage driving gear rotatably provided on the hollow shaft to be selectively engaged with the first synchronizer or the second synchronizer; and
   a third-stage driving gear rotatably provided on the hollow shaft to be selectively engaged with the second synchronizer.

4. The transmission apparatus for the vehicle according to claim 3, wherein the plurality of driven gears includes a first-stage driven gear engaged with the first-stage driving gear to form a first-stage shift ratio, a second-stage driven gear engaged with the second-stage driving gear to form a second-stage shift ratio, and a third-stage driven gear engaged with the third-stage driving gear to form a third-stage shift ratio.

5. The transmission apparatus for the vehicle according to claim 3, Wherein a first clutch gear to be engaged with the first synchronizer is integrally provided on a side of the second-stage driving gear, and a second clutch gear to be engaged with the second synchronizer is integrally provided on a second side of the second-stage driving gear.

6. The transmission apparatus for the vehicle according to claim 1, wherein the clutch device includes:
   a frictional clutch disposed between the hollow shaft and the input shaft and configured to receive a linear displacement along an axial direction of the input shaft from an outside thereof and configured to allow a frictional force generated in a clutch disk provided on the hollow shaft to vary in proportion to the linear displacement; and
   an actuator coupled to the frictional clutch and configured to provide, to the frictional clutch, the linear displacement along the axial direction of the input shaft.

7. The transmission apparatus for the vehicle according to claim 6, wherein the actuator includes:
   a housing;
   a ball screw device, wherein a screw of the ball screw device is engaged with a ball nut and the ball screw device is provided in the housing to provide the linear displacement to the frictional clutch by the ball nut selectively moving linearly along a predetermined direction of the input shaft;
   a control motor connected to the screw of the ball screw and provided in the housing to drive the screw of the ball screw device; and
   a self-locking mechanism provided in the housing to support the ball nut, which is in an advanced state toward the frictional clutch by interlocking therebetween with a rotation of the screw, to prevent a reverse movement of the ball nut.

8. The transmission apparatus for the vehicle according to claim 7, wherein the self-locking mechanism includes:
   a wedge piston provided in the housing to linearly move in a direction perpendicular to the predetermined direction of the input shaft while being in contact with an inclined surface of the ball nut by an inclined surface of the wedge piston; and
   an interlocking device engaged with the wedge piston and provided to move the wedge piston linearly by receiving a rotational force of the screw.

9. The transmission apparatus for the vehicle according to claim 8, wherein the interlocking device includes:
   a rack gear formed on a portion of the wedge piston and rotatably mounted to the housing;
   a pinion engaged with the rack gear; and an interlocking gear connected to the pinion and configured to be gear-engaged with a portion of the screw.

* * * * *